United States Patent
Lehmann et al.

(10) Patent No.: US 7,317,748 B2
(45) Date of Patent: Jan. 8, 2008

(54) METHODS AND APPARATUS FOR TRANSMITTING AND RECEIVING RANDOMLY INVERTED WIDEBAND SIGNALS

(75) Inventors: Nikolaus H. Lehmann, Bad Schwalback (DE); Alexander M. Halmovich, North Brunswick, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 722 days.

(21) Appl. No.: 10/786,947

(22) Filed: Feb. 25, 2004

(65) Prior Publication Data

US 2004/0190596 A1     Sep. 30, 2004

Related U.S. Application Data

(60) Provisional application No. 60/449,919, filed on Feb. 25, 2003.

(51) Int. Cl.
*H00B 1/69* (2006.01)

(52) U.S. Cl. .................................... 375/138

(58) Field of Classification Search ............ 375/138, 375/130, 132, 316, 295; 370/324, 213
See application file for complete search history.

(56) References Cited

U.S. PATENT DOCUMENTS

| | | | |
|---|---|---|---|
| 5,345,471 A | 9/1994 | McEwan | |
| 5,523,760 A | 6/1996 | McEwan | |
| 5,901,172 A | 5/1999 | Fontana et al. | |
| 6,606,350 B2 | 8/2003 | Dress, Jr. et al. | |
| 6,834,073 B1* | 12/2004 | Miller et al. | 375/130 |
| 6,836,226 B2* | 12/2004 | Moore | 341/59 |
| 7,103,109 B2* | 9/2006 | Nakache et al. | 375/295 |
| 2003/0165184 A1* | 9/2003 | Welborn et al. | 375/146 |
| 2003/0227961 A1 | 12/2003 | Batra et al. | |
| 2003/0227984 A1 | 12/2003 | Batra et al. | |
| 2004/0156504 A1* | 8/2004 | Mo et al. | 380/210 |

OTHER PUBLICATIONS

Moe Z. Win et al., Ultra-Wide Bandwidth Time-Hopping Spread-Spectrum Impulse Radio for Wireless Multiple-access Communications, IEEE Transactions on Communications, vol. 48, No. 4, pp. 679-691, Apr. 2000.

Jac Romme et al., On the Power Spectral Density of Time-Hopping Impulse Radio, IEEE Conference on Ultra Wideband Systems and Technologies, 2002.

Moe Z. Win, Spectral Density of Random Time-Hopping Spread-Spectrum UWB Signals with Uniform Timing Jitter, Proc. MICOM '99, vol. 2, pp. 1196-1200, 1999.

* cited by examiner

*Primary Examiner*—Khai Tran
(74) *Attorney, Agent, or Firm*—RatnerPrestia

(57) ABSTRACT

Methods and apparatus for transmitting, receiving, and processing wideband signals with reduced discrete power spectral density components are disclosed. The wideband signals with reduced discrete power spectral density components are generated through pulse modulation, repeating and time hopping, and random inversion. A receiver reverses the random inversion and demodulates the signal.

25 Claims, 9 Drawing Sheets

METHODS AND APPARATUS FOR TRANSMITTING AND RECEIVING RANDOMLY INVERTED WIDEBAND SIGNALS

CROSS REFERENCE TO RELATED APPLICATIONS

This application claims the benefit of the filing date of U.S. Provisional Application No. 60/449,919 entitled "Method for Controlling Power Spectral Density of a Time Hopping Ultra-Wide-Band Signal," filed Feb. 25, 2003, the contents of which are incorporated herein by reference.

FIELD OF THE INVENTION

The present invention relates to the field of communications and, more particularly, to methods and apparatus for transmitting and receiving wideband signals such as ultra wideband (UWB) signals with random or pseudo random polarity inversion.

BACKGROUND OF THE INVENTION

Ultra wideband (UWB) technology uses base-band pulses of very short duration to spread the energy of transmitted signals very thinly from near zero to several GHz. UWB technology is presently in use in military applications and techniques for generating UWB signals are well known. Commercial applications will soon become possible due to a recent decision announced by the Federal Communications Commission (FCC) that permits the marketing and operation of consumer products incorporating UWB technology.

The key motivation for the FCC's decision to allow commercial applications is that no new communication spectrum is required for UWB transmissions because, when they are properly configured, UWB signals can coexist with other application signals in the same spectrum with negligible mutual interference. The FCC has specified emission limits for UWB applications to prevent interference with other communication systems.

The emission profile of a UWB signal can be determined by examining its power spectral density (PSD). The PSD for ideal synchronous data pulse streams based upon stochastic theory is well known. Characterization of the PSD of a "Time-Hopping Spread Spectrum" signaling scheme in the presence of random timing jitter using a stochastic approach is disclosed in an article by Win et al; entitled "On the Power Spectral Density of Digital Pulse Streams Generated by M-ary Cyclostationary Sequences in the Presence of Stationary Timing Jitter." See IEEE Tran. on Comm., Vol. 46, no. 9, pp. 1135-1145, September 1998. According to this article, the power spectra of UWB signals consists of continuous and discrete components. Discrete components create peaks in the PSD that may exceed the FCC emission limits even when the continuous components are well below these limits.

There is an ever present desire to increase the communication distances of communication systems. One way to increase communication distance is to increase the power used for transmissions. To increase transmission power while still conforming to the FCC emission limits for UWB signals, it is desirable to reduce the discrete components so that overall power can be increased while still conforming to the FCC emission limits for UWB signals. In traditional communication systems, scramblers are commonly used to reduce discrete components (i.e., data whitening). These scramblers, however, are insufficient for reducing discrete PSD components in UWB time hopping communication systems since the discrete spectral components do not result from a correlated or biased source data stream but are due to the repetition of pulses modulated by the same source data. Accordingly, improved methods and apparatus for transmitting and receiving UWB signals having reduced discrete PSD components are-needed. The present invention fulfills this need among others.

SUMMARY OF THE INVENTION

The present invention is embodied in methods and apparatus for transmitting and receiving wideband signals with reduced discrete power spectral density (PSD) components. The wideband signals with reduced discrete power spectral density components are generated by pulse modulating the source data, repeating and time hopping pulses within the pulse modulated source data, selectively inverting the polarity of the repeated and time hopped pulses, and modulating the wideband signal pulses with the selectively inverted pulses.

BRIEF DESCRIPTION OF THE DRAWINGS

The invention is best understood from the following detailed description when read in connection with the accompanying drawings, with like elements having the same reference numerals. Included in the drawings are the following figures.

DETAILED DESCRIPTION OF THE INVENTION

Figure 1:
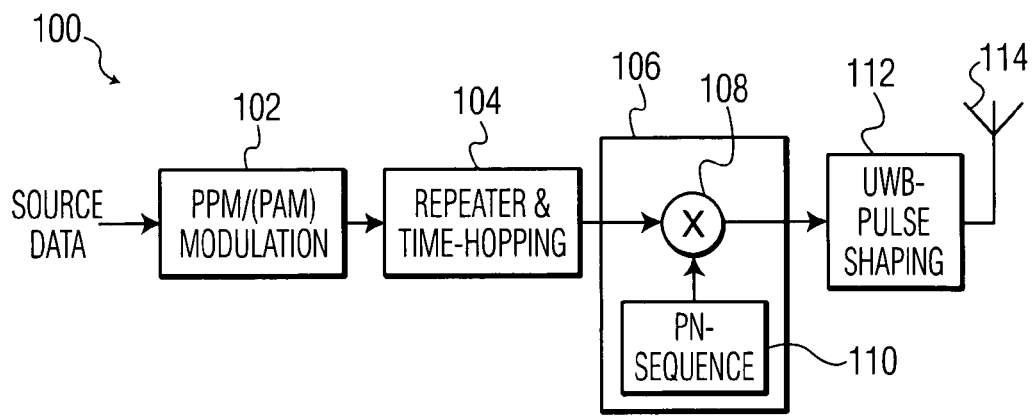
FIG. 1 is a block diagram of an exemplary transmitter in accordance with the present invention.
Figure 2A:
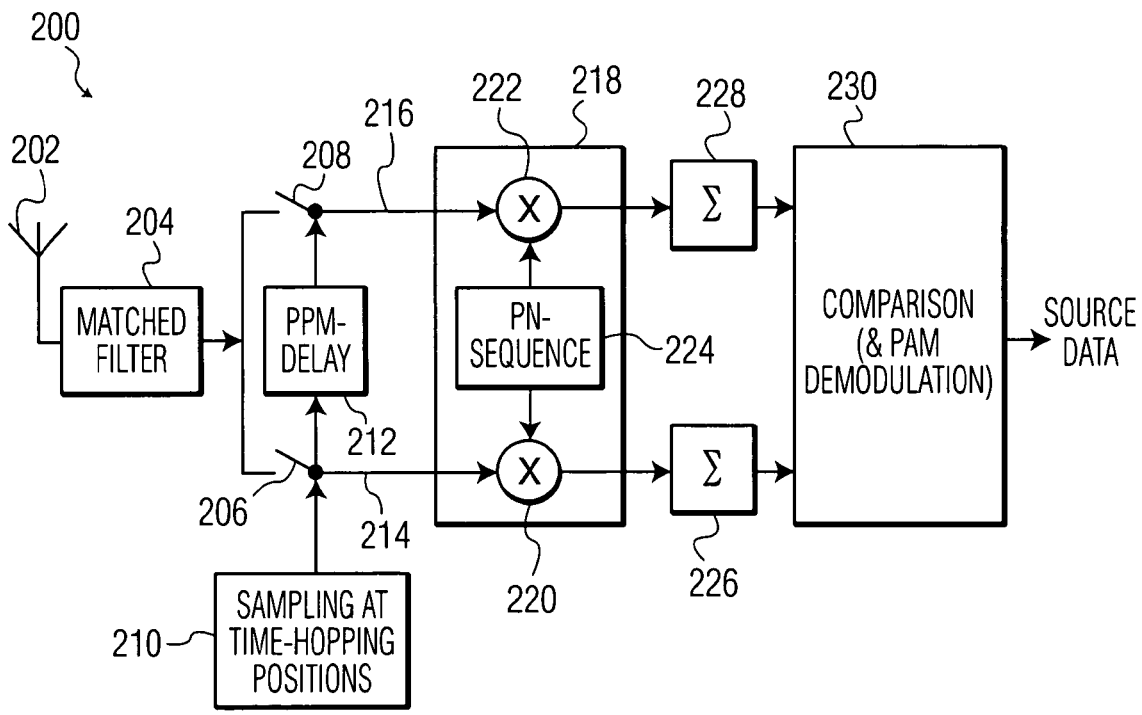
FIG. 2A is a block diagram of an exemplary receiver in accordance with the present invention.
Figure 2B:
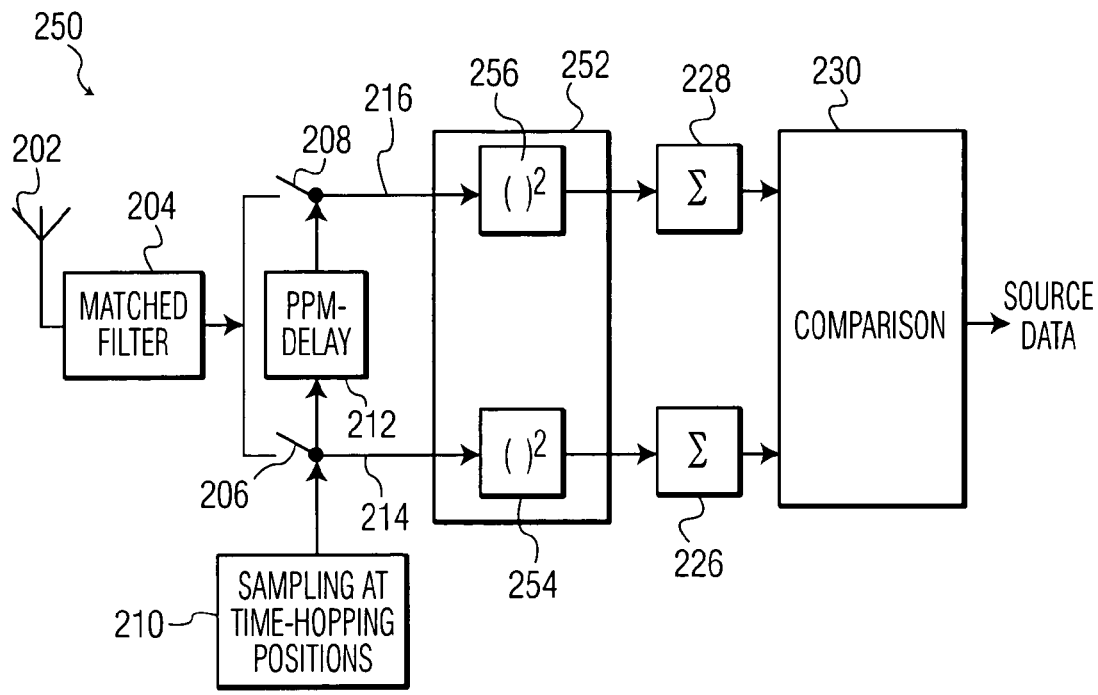
FIG. 2B is a block diagram of an alternative exemplary receiver in accordance with the present invention.

In accordance with the present invention, FIG. 1 is a conceptual representation of an exemplary transmitter 100, FIG. 2A is a conceptual representation of an exemplary receiver 200, and FIG. 2B is a conceptual representation of an alternative exemplary receiver 250. Functions of one or more blocks within the illustrated transmitter 100 and receivers 200 and 250 can be performed by the same piece of hardware or module of software. It should be understood that embodiments of the present invention may be implemented in hardware, software, or a combination thereof. In such embodiments, the various component and steps described below may be implemented in hardware and/or software.

With reference to FIG. 1, the exemplary transmitter 100 is now described. Source data is applied to a modulator 102. The modulator 102 is a pulse position modulator that modulates the source data using a pulse modulation scheme such as a pulse position modulation (PPM) scheme and/or a pulse amplitude modulation scheme (PAM). In an exemplary embodiment, the modulator 102 modulates each bit of the source data using two or more position modulation such as a two position PPM (2PPM) scheme in which each bit of the source data is positioned in either a first position or a second position of a symbol. For example, a logic zero ("0") in the source data may result in a pulse being positioned in a first position (e.g., first half) of the symbol and a logic one ("1") in the source data may result in a pulse being positioned in a second position (e.g., second half) of the symbol, or vice versa. In alternative exemplary embodiments, the source data is PAM modulated by the modulator 102 in addition to or instead of PPM modulation. A suitable modulator for use with the present invention will be understood by those of skill in the art from the description herein.

The pulse modulated source data is then applied to a repeater 104 coupled to the modulator 102. The repeater 104 repeats pulses within the pulse modulated source data and positions corresponding repeated pulses within data stream using a time hopping scheme. For example, the repeater 104 may repeat each pulse 5 times and may position the pulses within the data stream with time hopping delay positions, $C_j$, to implement time hopping for transmission by the transmitter 100. A suitable repeater with time hopping will be understood by those of skill in the art from the description herein.

An inverter 106 coupled to the repeater 104 randomly (e.g., pseudo randomly) inverts the polarity of pulses within the modulated and repeated data stream. In an exemplary embodiment, the inverter 106 includes a multiplier 108 and a pseudo random number (PN) sequence generator 110 such as a linear feedback shift register (LFSR). The multiplier 108 selectively inverts pulses within the modulated and repeated data stream responsive to the PN sequence generator 110 such that each pulse has either a first polarity (e.g., positive) or a second polarity (e.g., negative) that is opposite the first polarity. For example, if the multiplier 108 multiplies 2PAM modulated bits by +1 or −1 (e.g., using an XOR or NOR logic circuit), the multiplier 108 inverts pulses of the data stream responsive to logic ones ("1s") generated by the PN sequence generator and leaves pulses unchanged responsive to logic zeros ("0s") generated by the PN sequence generator 110. In an exemplary embodiment, non-inverted pulses have a value of one ("1") and inverted pulses have a value of negative one ("−1").

Pulse shaping circuitry 112 coupled to the inverter 104 shapes the pulses for transmission via the antenna 114. In an exemplary embodiment, the pulse shaping circuitry 112 is wideband pulse shaping circuitry such as UWB pulse shaping circuitry. Suitable pulse shaping circuitry for use with the present invention will be understood by those of skill in the art from the description herein.

With reference to FIG. 2A, the exemplary receiver 200 is now described. Signals transmitted by the transmitter 100 (FIG. 1) are received via an antenna 202 in the receiver 200. A matched filter 204 coupled to the antenna 202 discriminates the pulses within the received signal to produce a pulse stream. In an exemplary embodiment, the pulse stream is pulse modulated using a modulation scheme such as a PPM and/or a PAM scheme. The matched filter 204 may be a wideband matched filter such as UWB matched filter configured to discriminate UWB pulses. Suitable matched filters for use with the present invention will be understood by those of skill in the art from the description herein.

A sampling circuit 210 samples the modulated pulse stream out of the matched filter 204 at time hopping delay positions, $C_j$. In the illustrated embodiment, the sampling circuit 210 is operably coupled to a first switch 206 and a second switch 208. Assuming the signal is a 2PPM signal, the first switch 206 passes pulses in a first pulse modulated position to form a first intermediate pulse stream in a first pulse stream path 214 and the second switch 208 (delayed by a PPM delay circuit 212) passes pulses in a second pulse modulated position to form a second intermediate pulse stream in a second pulse stream path 216. In embodiments without PPM, only one pulse stream path 214 or 216 is used and, in embodiments with more pulse positions than a 2PPM system, it may be desirable to use additional pulse stream paths.

The pulse streams are applied to an inverter 218 coupled to the matched filter 204 that selectively inverts pulses within the pulse steams to reverse the inversion introduced by the inverter 106 (FIG. 1) in the transmitter 100 (FIG. 1). In an exemplary embodiment, a pulse stream in the first pulse stream path 214 is applied to a first multiplier 220 of the inverter 218 and a pulse stream in the second pulse stream path 216 is applied to a second multiplier 222. The first and second multipliers 220 and 222 are coupled to a PN sequence generator 224, which generates a pseudo random number sequence substantially identical and relatively synchronous to the sequence produced by the PN sequence generator 110 (FIG. 1) in the transmitter 100 (FIG. 1) to reverse the random inversion of the pulses. Each of the first and second multipliers 220 and 222 may be a multiplier such as the multiplier 108 (FIG. 1) described above.

Although the sampling circuit 210 and corresponding switches are positioned before the inverter 218 such that the modulated pulse stream is sampled and, then, inverted, the sampling circuit 210 and corresponding switches may be positioned after the inverter 218 such that the modulated pulse stream is inverted and then sampled.

The selectively inverted pulses of corresponding pulses within the pulse streams are summed. In the illustrated embodiment, the corresponding pulses of the pulse stream in the first path 214 are summed at a first summing circuit 226 and the corresponding pulses of the pulse stream in the second path 216 are summed at a second summing circuit 228. Due to the timing of the sampling circuit 210, the summing circuits 226 and 228 sum signal values in particular pulse modulation positions across the time hopping intervals for corresponding pulses. For example, if each pulse is repeated five times, the first summing circuit 226 sums the signal samples in a first pulse position and the second summing circuit 228 sums the signal samples in a second pulse position of the five time hopping positions associated with the same data symbol.

A comparison circuit 230 coupled to the summing circuits compares and processes the summed values of corresponding pulses to recover the original source data. In the illustrated embodiment, the comparison circuit 230 compares the summed value from the first summing circuit 226 (which includes values corresponding to a first pulse modulation position and, thus, a logic zero) to the summed value from the second summing circuit 228 (which includes values corresponding to a second pulse modulation position and, thus, a logic one). If a 2PPM modulation scheme is used, a greater value produced by the first summing circuit 226 indicates a logic zero and a greater value produced by the second summing circuit 228 indicates a logic one.

Since all corresponding pulses have the same pulse position, the pulse position containing the modulated pulses will be relatively large and the other pulse position may be relatively small, e.g., representing "background noise" only. Thus, the PPM modulation may be demodulated by selecting the logic value corresponding to the summed stream with the greatest value. In embodiments where PAM modulation is employed, the comparison circuit 230 may further PAM demodulate the summed stream in a manner that will be understood by those of skill in the art from the description herein.

With reference to FIG. 2B, the alternative exemplary receiver 250 is now described. The receiver 250 is very similar to the receiver 200 described above with reference to FIG. 2A except that the inverter 218 is replaced with a function circuit 252 that applies a function to map pulses of either polarity within the wideband signal to a single polarity to produce pulse streams in which all pulses have the same polarity. Due to the degree of similarity between the illustrated receivers 200 and 250, only the differences between them will be described with reference to FIG. 2B. In an exemplary embodiment, source data for receipt by the receiver 250 is pulse modulated according to a PPM scheme and time hopped, but is not modulated according to a PAM scheme.

In the illustrated embodiment, the function circuit 252 includes a first squaring circuit 254 and a second squaring circuit 256. The squaring circuits 254/256 produce pulses with the same polarity by squaring each pulse. Once the pulses all have the same polarity, the corresponding pulses can be summed and demodulated as described above. In a digital domain, the function circuit 252 may square the pulses or drop a sign bit from pulses within a pulse stream to produce a pulse stream in which all pulses have the same polarity. In an analog domain, the function circuit 252 may duplicate each pulse and multiply each pulse by its corresponding duplicate to produce a pulse stream in which all pulses have the same polarity. Various alternative embodiments for producing a pulse stream in which all pulses have the same polarity will be understood by those of skill in the art from these exemplary embodiments and the description herein.

It is desirable to use a relatively long PN sequence for randomly inverting the pulses prior to transmission. In an exemplary embodiment, the period of the PN sequence is at least as long as the number of pulses which are transmitted during an observation period for a complete estimation of the spectrum. Typically, relatively long PN sequences are avoided due to difficulties in synchronizing the transmitter 100 (FIG. 1) and the receiver 200 (FIG. 2A). In the receiver 250 depicted in FIG. 2B, the receiver 250 recovers the source data without any knowledge of the PN sequence used by the transmitter 100 (FIG. 1) for random inversion. Thus, longer PN sequences may be employed without burdening the receiver 250 with synchronization and having to apply a relatively long PN sequence. Since sign information is lost, however, this technique is not suitable for use with a PAM scheme.

Figure 3:
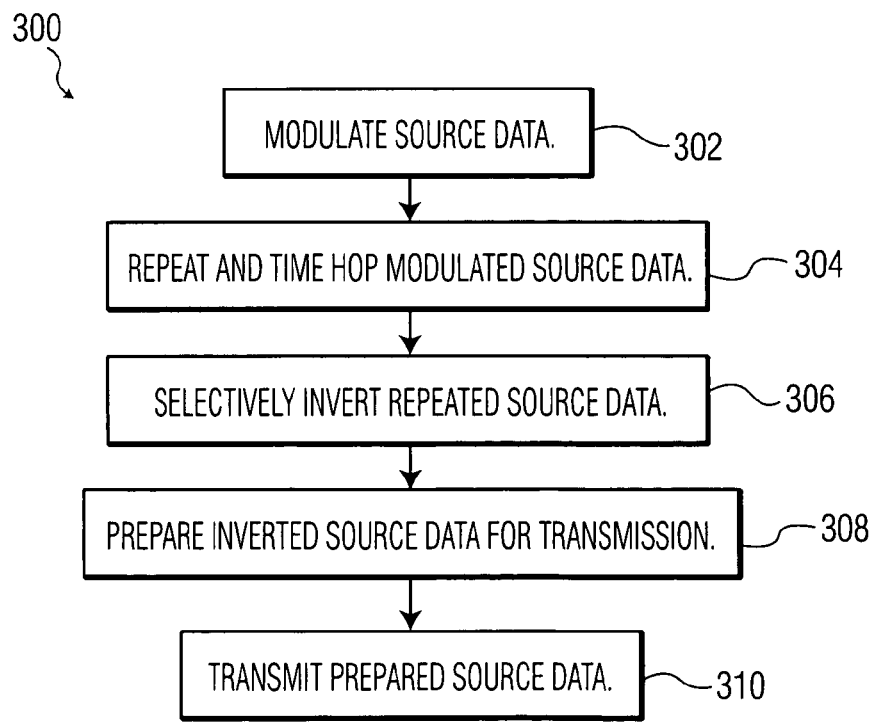
FIG. 3 is a flow chart of exemplary transmitting steps in accordance with the present invention.

FIG. 3 is a flow chart 300 of exemplary steps for transmitting source data in accordance with the present invention. The exemplary steps are described with reference to the transmitter 100 of FIG. 1. At block 302, the modulator 102 within the transmitter 100 modulates the source data. The source data is modulated using a pulse modulation scheme such as a PPM scheme (e.g., 2PPM) and/or a PAM scheme.

At block 304, the repeater 104 repeats and time hops pulses within the modulated source data. In an exemplary embodiment, each pulse is repeated at least twice (e.g., 5 times) for time hopping. At block 306, the inverter 106 selectively inverts pulses of the repeated source data.

At block 308, the selectively inverted pulses are prepared for transmission. In an exemplary embodiment, the pulse shaping circuit 112 generates a wideband signal pulse such as a UWB signal pulse. At block 310, the transmitter 100 transmits the signal pulses via antenna 114.

Figure 4A:
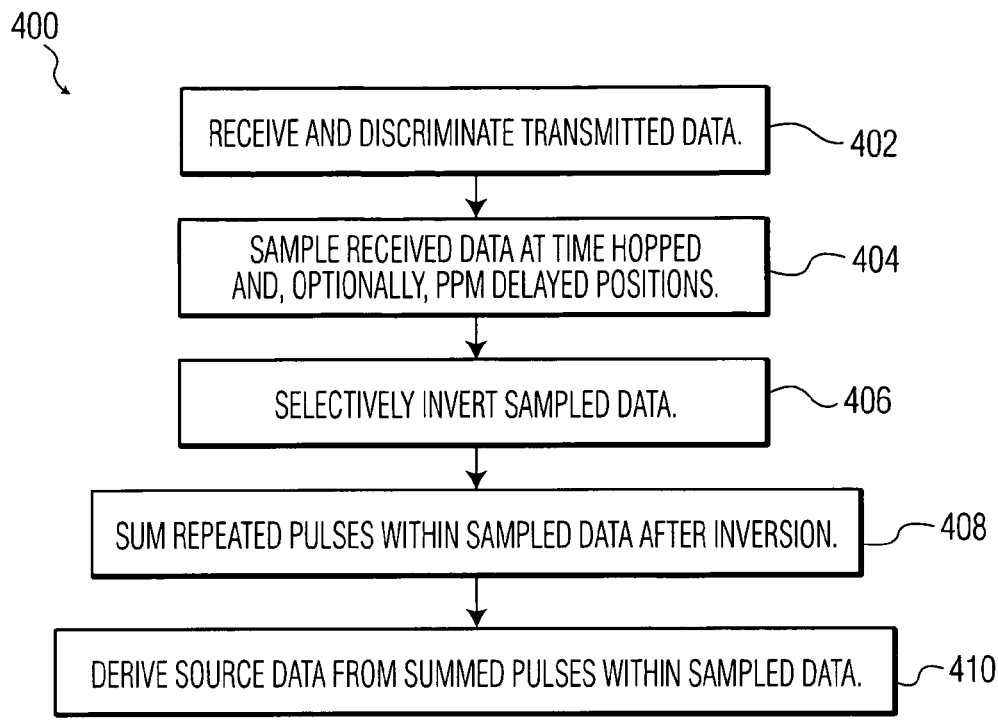
FIG. 4A is a flow chart of exemplary receiving steps in accordance with the present invention.

FIG. 4A is a flow chart 400 of exemplary receiving steps. The exemplary steps are described with reference to the exemplary receiver 200 of FIG. 2A. At block 402, the receiver 200 receives a transmitted data signal in accordance with the present invention. In an exemplary embodiment the received data signal is time hopped and pulse modulated, e.g., using a PPM and/or PAM modulation scheme.

At block 404, the received data signal is sampled at time hopped and, optionally, PPM delayed positions.

At block 406, the inverter 218 selectively inverts the sampled signals to reverse the inversion introduced by the inverter 106 (FIG. 1) of the transmitter 100 (FIG. 1). In an exemplary embodiment, the PN sequence generator 224 generates a PN sequence that is substantially identical to the PN sequence generated by PN sequence generator 110. For synchronization, the PN sequence generators 110 and 224 are configured to start at a common point when the first bit of a sequence is transmitted or received.

Alternatively, the inversion may be reversed prior to sampling. In accordance with this embodiment, the steps corresponding to blocks 404 and 406 are reversed.

At block 408, the repeated pulses are summed and, at block 408, the source data is derived from the summed pulses within the sampled data. If the data is PPM modulated, the pulse stream with the largest summed value indicates the pulse position, thereby enabling PPM demodulation. In addition, if a PAM modulation scheme is employed, PAM demodulation may be performed in a manner that will be understood by those of skill in the art.

Figure 4B:
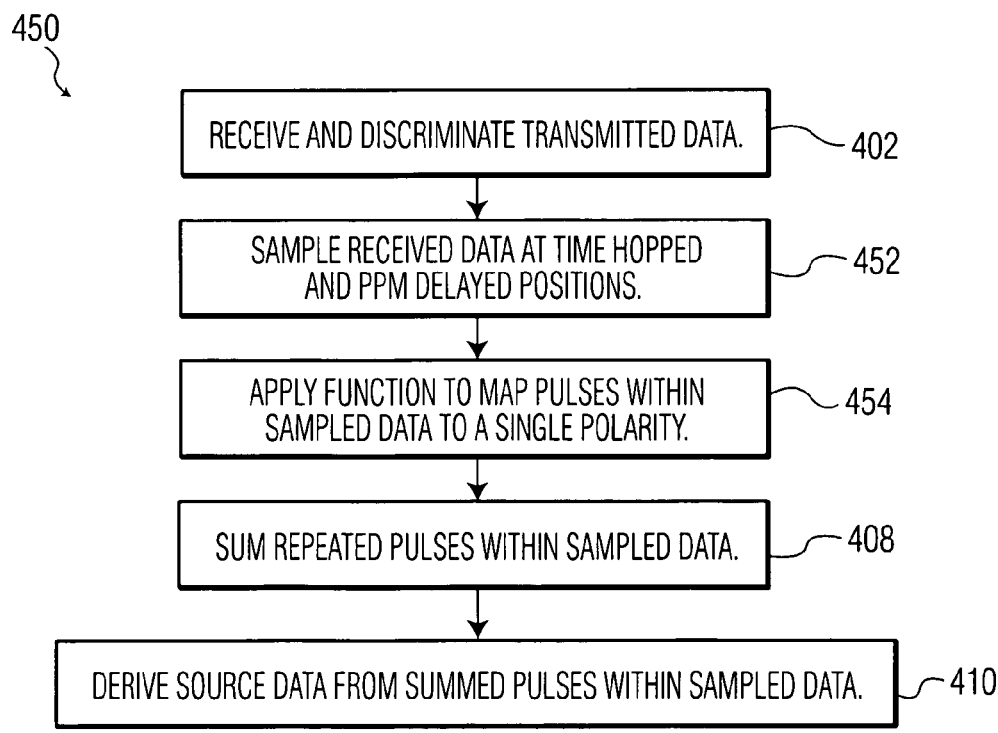
FIG. 4B is a flow chart of alternative exemplary receiving steps in accordance with the present invention.

FIG. 4B is a flow chart 450 of alternative exemplary receiving steps. The exemplary steps are described with reference to the exemplary receiver 250 of FIG. 2B. The receiving steps in flow chart 450 are similar to the receiving steps of flow chart 400 (FIG. 4A) with common steps being identically numbered. At block 402, the receiver 200 receives a transmitted data signal in accordance with the present invention. In an exemplary embodiment the received data signal is both modulated using a PPM modulation scheme and time hopped. At block 452, the received data signal is sampled at time hopped and PPM delayed positions.

At block 454, the function circuit 252 maps pulses of each of two polarities to a single polarity. In an exemplary embodiment, the function circuit 252 squares each pulse. In an alternative exemplary embodiment, the function circuit 252 multiplies each pulse by a corresponding identical pulse in the analog domain. In another alternative exemplary embodiment, the function circuit 252 drops sign bits associated with a digital signal representing each pulse.

Alternatively, the polarity may be mapped to a single polarity prior to sampling. In accordance with this embodiment, the steps corresponding to blocks 452 and 454 are reversed.

At block 408, the repeated pulses are summed and, at block 408, the source data is derived from the summed pulses within the sampled data. The pulse stream with the largest summed value indicates the pulse position, thereby enabling PPM demodulation.

Additional technical details are now provided. The time hopping process influences the PSD of the UWB signal. General analytical expressions for different kinds of time hopping are set forth below. In addition, graphs representing the results of simulations are presented. These simulations are based on both a realistic signal model and a procedure to analyze the PSD regarding the FCC recommendations for measurements.

A description of the simulation is now provided. The plots shown in FIGS. 5A, 5B, 6A, 6B, 7A, 7B, 8A, 8B, 9A and 9B were generated based on the following assumptions: a resolution in the frequency domain of 1 MHz; estimates of the PSD being obtained by averaging a series of separated fast Fourier Transforms (FFTs) over extracts of the signal; and the number of extracts being chosen such that the total duration of the considered signal is 1 ms, which corresponds approximately to a bandwidth of 1 kHz.

The pulse function used is the 7th derivative of the Gaussian probability density function (PDF) with $\sigma=64$ ps to satisfy the FCC regulation for outdoor devices. Further, a data rate of 10 Mbps ($T_s=100$ ns) and five pulse repetitions (R=5), which results in a frame duration of $T_F=20$ ns, are considered. The hopping index is $T_{TH}=2.1$ ns and the Modulation index is $T_{PPM}=0.5$ ns. The size of the hopping alphabet, q, is limited to 5 and the length of the finite sequence is 5.

All of the PSD plots are generated using the Bartlett periodogram method described in a text by J. G. Proakis et al. entitled *Digital Signal Processing*, Prentice Hall, third edition, 1996.

An analysis of the PSD for finite time hopping sequences is now provided. A UWB signal for multiple access is a stream of narrow pulses, which are either shifted in time (PPM) or amplitude modulated (PAM) or both. To limit the effects of catastrophic collisions, the same modulated pulse is repeated R times at different time shifts, which are determined by a time hopping sequence described by the vector $\vec{c}=(c_0, \ldots, c_{p-1})$. The elements of this vector are positive integers smaller than q and the time hopping sequence is repeated several times during a data transmission.

The signal S(t) is described in equation (1) as:

$$S(t) = \sum_{l=-\infty}^{\infty} \frac{1}{R} \sum_{i=0}^{R-1} A_l \cdot \qquad (1)$$
$$g_{Pulse}(t - l \cdot T_S - B_l \cdot T_{PPM} - i \cdot T_F - c_{(l \cdot R + i)_P} \cdot T_{TH})$$

In the expression $(l*R+i)_p=(l*R+i)$ mod P, where "mod" indicates modulo division, and $g_{pulse}(t)$ is the basic transmitted pulse, e.g. a monocycle. The values $A_l$ and $B_l$ represent the data modulation, which take place once per symbol time $T_s$. Thus, this signal includes both PAM and PPM.

$A_l$ and $B_l$ are modeled as stochastic processes. In each frame of duration $T_F$ only one pulse is transmitted. $T_{PPM}$ is the PPM Modulation Index and $T_{TH}$ is the Time Hopping Index. When M,N represents a smallest pair of integers for which N*R=M*P is valid, the periodic repeated sequence can be represented by N subsequences. Thus, it is possible to describe the time hopping as a filter with a deterministically varying discrete impulse response $g_l(t)$. For convenience, a pulse stimulating process M(t), which includes both time hopping and data modulation, is introduced. The radiated signal may be represented by the equation S(t)=M(t)*$g_{Pulse(t)}$ and the total PSD by:

$$S_{ss}(f)=|G_{Pulse}(f)|^2 * S_{MM}(f).$$

Further the modulation by the two processes $A_l$ and $B_l$ may be substituted with the process D(t) to provide the equations in Table 1.

TABLE 1

$$M(t) = \sum_{k=-\infty}^{\infty} \sum_{l=0}^{N-1} D(t - l \cdot T_S - k \cdot N \cdot T_S) * g_l(t)$$

$$D(t - l \cdot T_S) = A_l \cdot \delta(t - l \cdot T_S - B_l \cdot T_{PPM})$$

$$g_l(t) = \frac{1}{\sqrt{R}} \sum_{i=0}^{R-1} \delta(t - c_{(l \cdot R + i)_p} \cdot T_{TH})$$

To derive the PSD of the stimulating process, it is noted that the auto correlation function of the process, $\phi_{MM}$(t+tau, t), is periodic, thus the time-average auto correlation function may be described by equation (2).

$$\hat{\varphi}_{MM}(\tau) = \frac{1}{NT_S} \int_0^{NT_S} \varphi_{MM}(t + \tau, t) dt \qquad (2)$$
$$= \frac{1}{NT_S} \int_0^{NT_S} E\{M(t)M(t+\tau)\} dt$$

The PSD of $S_{MM}(f)$ may then be derived by calculating the Fourier transform of the time-average auto correlation function. This is represented by equation (3).

$$S_{MM}(f) = \frac{1}{NT_S} \cdot \left( \sum_{l=0}^{N-1} G_l^*(f) G_l(f) E_{l=l'} \{A_l A_{l'}\} + \right. \qquad (3)$$
$$E_{l \neq l'} \{A_l A_{l'}\} E_{l \neq l'} \{e^{-j2\pi f T_{PPM}(B_{l'} - B_l)}\} \cdot$$
$$\left( \frac{1}{NT_S} \sum_{k=-\infty}^{\infty} \sum_{l=0}^{N-1} \sum_{l'=0}^{N-1} (G_l^*(f) G_{l'}(f) \cdot \right.$$
$$\left. \left. e^{-j2\pi f T_S(l-l')} \delta\left(f - \frac{k}{NT_S}\right)\right) - \sum_{l=0}^{N-1} G_l^*(f) G_{l'}(f) \right) \right)$$

In this equation, $G_l(f)$ is the Fourier transform of the l-th time hopping filter $g_l(t)$. The different expectation values describe properties of the modulation. The data is assumed to be uncorrelated. Each of $E\{A_l A_{l'}\}$ and $E\{e^{-j2\pi f T_{ppm}(B_l - B_l)}\}$ can have only two values, one for the case when the indices (l and l') are equal and one for the case when they are unequal.

The PSD of a binary PPM Signal (i.e., 2PPM) signal can be derived from equation (3), if the expectation values are evaluated to produce equation (4).

$$E_{l=l'}\{A_l A_{l'}\} = E_{l \neq l'}\{A_l A_{l'}\} = 1 \qquad \forall\, l, l' \qquad (4)$$

$$E_{l=l'}\{e^{-j2\pi f T_{PPM}(B_{l'} - B_l)}\} = \frac{1}{2}(1 + \cos(2\pi f T_{PPM})) \quad \forall\, l \neq l'$$

The PSD then has the analytical expression given by equation (5).

$$S_{2PPM}(f) = \frac{1}{NT_S} \cdot \frac{1}{2}(1 - \cos(2\pi f T_{PPM})) \sum_{l=0}^{N-1} |G_l(f)|^2 + \qquad (5)$$
$$\frac{1}{(NT_S)^2} \cdot \frac{1}{2}(1 + \cos(2\pi f T_{PPM})) \cdot$$
$$\sum_{k=-\infty}^{\infty} \sum_{l=0}^{N-1} \sum_{l'=0}^{N-1} (G_l^*(f) \cdot G_{l'}(f) \cdot$$
$$e^{-j2\pi f T_S(l'-l)} \delta\left(f - \frac{k}{NT_S}\right)$$

This equation includes a discrete part, the second addend, sometimes called spectral lines, and a continuous part, the first addend.

Figure 5A:
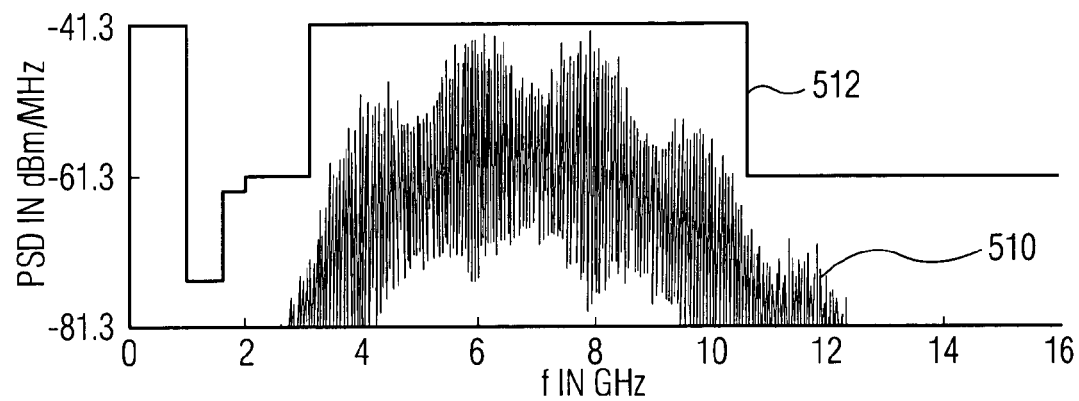
FIGS. 5A, 5B, 6A, 6B, 7A, 7B, 8A and 8B are graphs of amplitude versus frequency that are useful for describing the power spectral densities of existing modulation techniques.
Figure 5B:
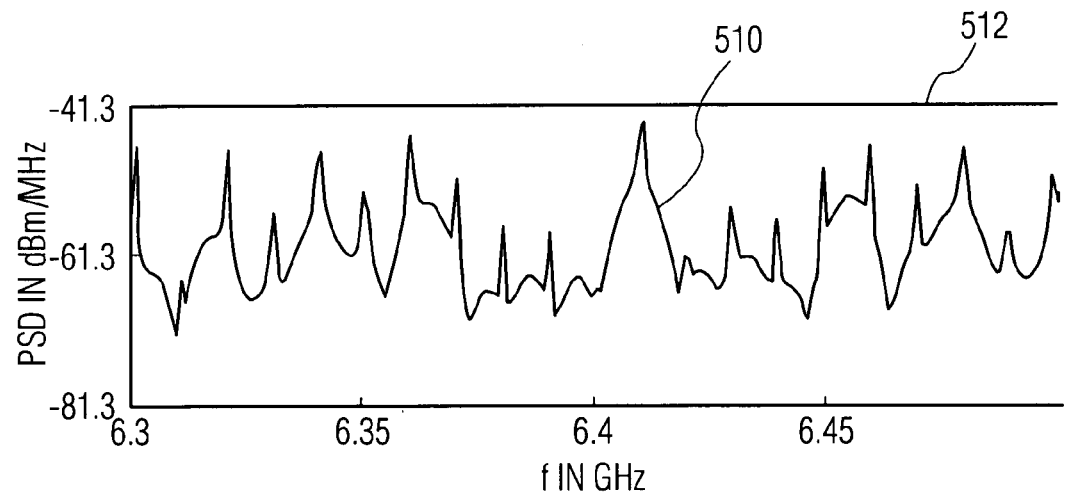

FIGS. 5A and 5B are two plots generated by using the simulation described above. The first plot in FIG. 5A shows the PSD 510 of a 2PPM signal and the emission limits 512 defined by the FCC for outdoor devices.

From the plots in FIGS. 5A and 5B, it is apparent that the average power must be decreased to prevent violations of the regulations by the discrete part. This greatly reduces the energy of the continuous part. One is able to distinguish between the discrete part and the continuous if an extract of the complete signal bandwidth is considered as shown in FIG. 5B. The FCC recommends a resolution of 1 MHz, therefore the discrete part of the PSD may be represented by peak pulses having a finite ordinate value instead of infinity.

The PSD of a binary PAM Signal (2PAM) is now described. The expectation values for 2PAM modulated pulses are given by equations (6).

$$E_{l=l'}\{A_l A_{l'}\} = 1 \quad \forall l=l'$$
$$E_{l\neq l'}\{A_l A_{l'}\} = 0 \quad \forall l\neq l'$$
$$E_{l=l'}\{e^{-j2\pi f T_{PPM}(B_{l'}-B_l)}\} = 1 \quad \forall l,l' \qquad (6)$$

Inserting the equations (6) into the general expression given by equation (3) yields to the PSD of a PAM modulated UWB signal. This is shown in equation (7).

$$S_{2PAM}(f) = \frac{1}{NT_S} \cdot \sum_{l=0}^{N-1} |G_l(f)|^2 \qquad (7)$$

Figure 6A:
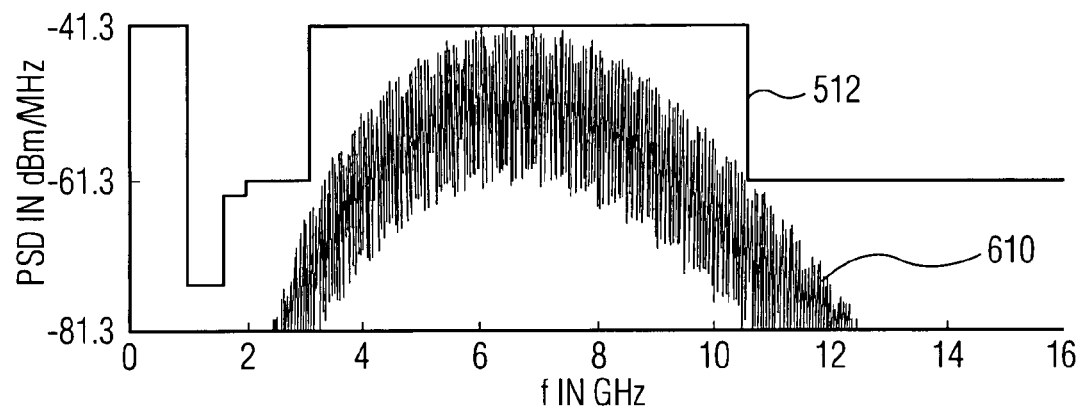
Figure 6B:
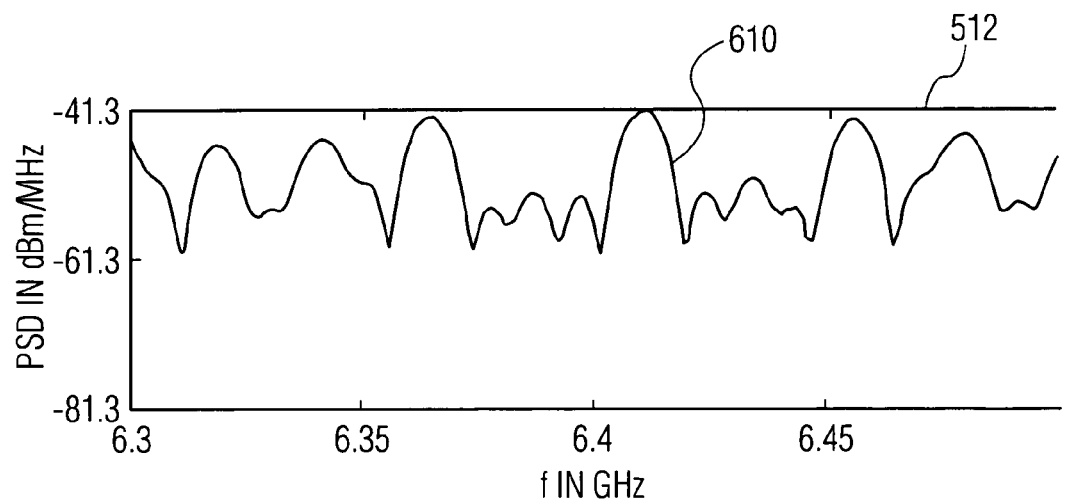

The PSD of a 2PAM Signal is completely continuous because the auto correlation function equals 0 for $|\tau|>T_s$. The PSD is still influenced by the time hopping sequence, however, as shown in FIGS. 6A and 6B. In FIGS. 6A and 6B, plot 610 represents the PSD of the PAM modulated UWB signal and plot 512 represents the FCC PSD emission limits.

Comparing FIG. 6B with FIG. 5B illustrates that the continuous part of the PSD is essentially the same for both PPM and PAM. In a PPM scheme it is just multiplied with $\frac{1}{2}(1-\cos(2 \pi f T_{PPM}))$ and additionally attenuated so that the complete signal does not violate the FCC limits.

A combined PPM/PAM modulation has substantially the same PSD as PAM because the auto correlation function is still vanishing for $|\tau|>T_s$. It is noted that the analysis here is based on repetition of the same data modulated pulse. This repetition is desirable to limit, for example, the effects of catastrophic collisions.

As the time hopping causes fluctuations of the transmitted power from narrow frequency bands to other bands, the total transmitted power is reduced so that the transmitted signal does not violate the FCC limits.

An analysis of the PSD of time hopping sequences with infinite length is now described. One way to attempt to reduce the effect of time hopping on the PSD is to increase the length P of the sequence. When this is done, the spectral lines in the PSD of a pure PPM signal are separated by a decreasing distance $1/(N\,T_s)$ and the continuous part of the spectrum is averaged over an increasing number of different frequency spectra $G_l(f)$ such that it may come close to a flat frequency spectrum.

It is noted, however, that, for this scheme to work, the time hopping sequence has to be known by the receiver. If a multiple access scheme is considered, in which the different links are distinguished by different sequences and there is no central base station responsible for assigning different sequences to the transmitters, the desired receivers have to acquire the sequence at the beginning of a transmission. Such a multiple access scheme has relatively high levels of interference and multi-path propagation. Accordingly, it is desirable to make the time hopping pattern relatively easy to acquire and, thus, the time hopping pattern should not be too long.

A more important concern, however, is that, even for very long sequences, the time hopping influences the PSD in a dominant way. The longer sequences result in an increase in the number of different frequency spectra $G_l(f)$, the average of these spectra shows the common property of the different $g_l(t)$, which is that the pulses are sent each frame of the duration $T_F$ and shifted by multiples of the time hopping index $T_{TH}$.

Further, the PSD of a PPM signal is also dominated by the duration of a symbol, $T_s$. The fixed time hopping index and the division of the symbol time in frames are desirable to ease implementation of the system (e.g., a sequence of non-discrete elements is obviously not a basis for a transmission of data). To illustrate this, sequences of infinite length are now considered. The time hopping sequence $C_i$ in the i-th frame of a symbol is treated as a random variable. Based on these assumptions, the filter stimulating signal M(t) can be written as equation (8).

$$M(t) = \sum_{l=-\infty}^{\infty} \frac{1}{\sqrt{R}} \sum_{i=0}^{R-1} A_l \cdot \qquad (8)$$
$$\delta(t - l \cdot T_S - B_l \cdot T_{PPM} - i \cdot T_F - C_{lR+i} \cdot T_{TH})$$

In contrast to equation (1), $C_i$, which is a element of the interval $[0, \ldots, q-1]$, is, in equation (8), not an element of a predetermined sequence but a sample of a stochastic process.

The auto correlation function of the process $\phi_{MM}(t+\tau,t)$ is now periodic with $T_S$. $S_{MM}(f)$ may be represented by equation (9).

$$S_{MM}(f) = \frac{1}{T_S} E_{l=l'}\{A_l A_{l'}\}\left(1 + \sum_{l=-\infty}^{\infty} \text{sinc}^2\left(\pi q T_{TH}\left(f - \frac{l}{T_{TH}}\right)\right) \cdot \qquad (9)\right.$$
$$\left. \left(\sum_{k=-\infty}^{\infty} R \cdot \text{sinc}^2\left(\pi R T_F\left(f - \frac{k}{T_F}\right)\right) - 1\right)\right) +$$

-continued $$E_{l \neq l'}\{A_l A_{l'}\} E_{l \neq l'}\{e^{-2\pi f(B_{l'}-B_l)T_{PPM}}\} \cdot \frac{R}{T_S} \cdot$$

$$\left(\frac{1}{T_S}\sum_{j=-\infty}^{\infty}\delta\left(f-\frac{j}{T_S}\right)-1\right)\sum_{l=-\infty}^{\infty}\mathrm{sinc}^2\left(\pi q T_{TH}\left(f-\frac{l}{T_{TH}}\right)\right) \cdot$$

$$\sum_{k=-\infty}^{\infty}\mathrm{sinc}^2\left(\pi R T_F\left(f-\frac{k}{T_F}\right)\right)$$

The sinc function $\mathrm{sinc}(x)=\sin(x)/x$ is used in this and in other expressions presented below.

It is noted from equation (9) that the general PSD has a continuous and a discrete part. Further, the time hopping index, the frame duration, and the symbol time are parameters in this PSD. Moreover, the undesirable concentration of transmission power in some narrow bands is linear with the number of repetitions R. It may be seen from equation (9) that the subbands get more narrow but higher in amplitude with an increasing number of repetitions.

The PSD of a PPM signal with random time hopping is now described. By substituting the expectation values in the general PSD in equation (9) in the same way as for the finite sequence in equation (4), the PSD of the pulse filter stimulating process is achieved as shown in equation (10).

$$S_{2PPM}(f) = \frac{1}{T_S} \cdot \left(1 + \sum_{m=-\infty}^{\infty}\mathrm{sinc}^2\left(q\pi T_{TH}\left(f-\frac{m}{T_{TH}}\right)\right) \cdot \right. \quad (10)$$

$$\left(\frac{1}{2}(1-\cos(2\pi T_{PPM}f))\cdot R \cdot \right.$$

$$\left.\sum_{k=-\infty}^{\infty}\mathrm{sinc}^2\left(R\pi T_F\left(f-\frac{k}{T_F}\right)\right)-1\right)+$$

$$\frac{1}{2}(1+\cos(2\pi T_{PPM}f)) \cdot \frac{R}{T_S}\sum_{i=-\infty}^{\infty}\delta\left(f-\frac{i}{T_S}\right)\cdot$$

$$\sum_{m=-\infty}^{\infty}\mathrm{sinc}^2\left(q\pi T_{TH}\left(f-\frac{m}{T_{TH}}\right)\right)\cdot$$

$$\left.\sum_{k=-\infty}^{\infty}\mathrm{sinc}^2\left(R\pi T_F\left(f-\frac{k}{T_F}\right)\right)\right)$$

Figure 7A:
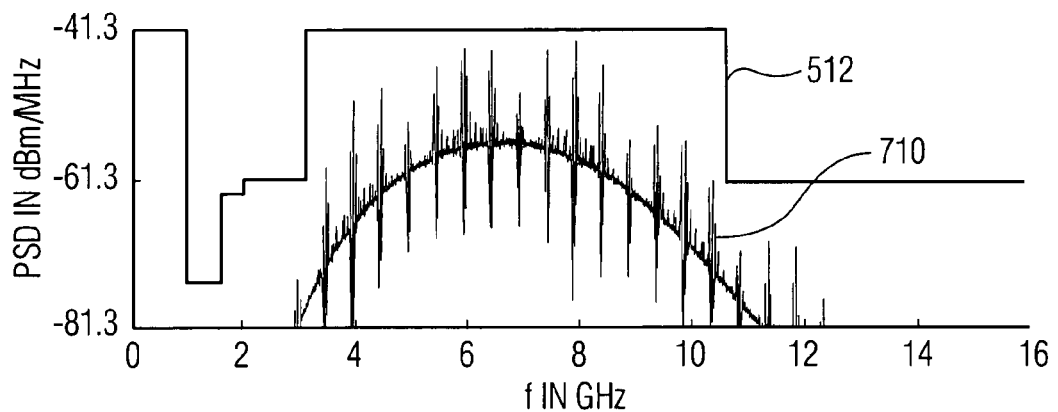
Figure 7B:
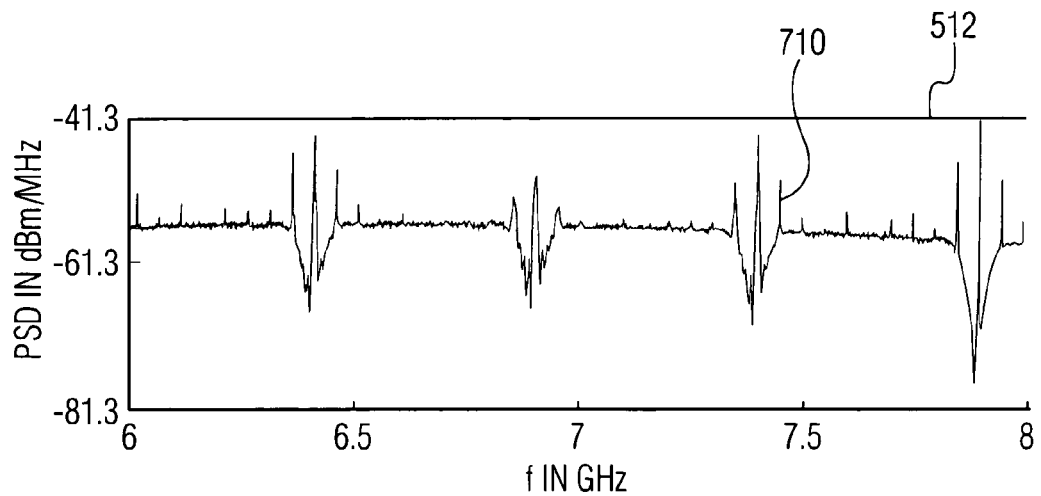

This PSD still consists of a discrete part and a continuous part. The plots shown in FIGS. 7A and 7B are produced using the simulation described above. Note that these results are also valid if the time hopping is deterministic, but the sequence length is longer than the observation interval that is used to derive the spectral expectation.

The sinc functions in a distance of $1/T_F$ and $1/T_{TH}$, respectively, are clearly apparent in the plot 710 in FIG. 7A covering the complete spectrum and an extract of the plot 710, shown in FIG. 7B. The distances between the discrete lines equals $1/T_F$, as the symbol time is a multiple of the frame duration.

The PSD of a PAM signal with random time hopping is now described. The PSD of a 2PAM signal can be derived as described above. The analytical expression is given by equation (11).

$$S_{2PAM}(f) = \frac{1}{T_S} \cdot \left(1 + \sum_{m=-\infty}^{\infty}\mathrm{sinc}^2\left(q\pi T_{TH}\left(f-\frac{m}{T_{TH}}\right)\right) \cdot \right. \quad (11)$$

-continued $$\left.\left(R\sum_{k=-\infty}^{\infty}\mathrm{sinc}^2\left(R\pi T_F\left(f-\frac{m}{T_F}\right)\right)-1\right)\right)$$

Figure 8A:
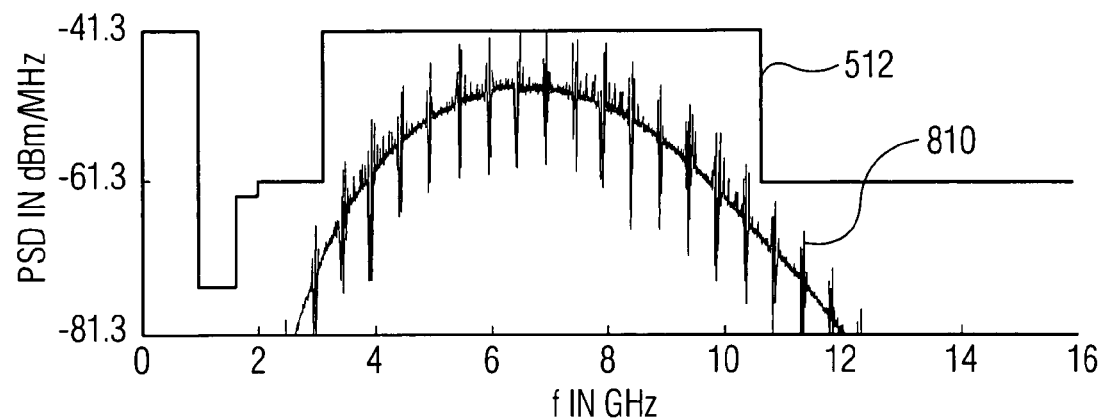
Figure 8B:
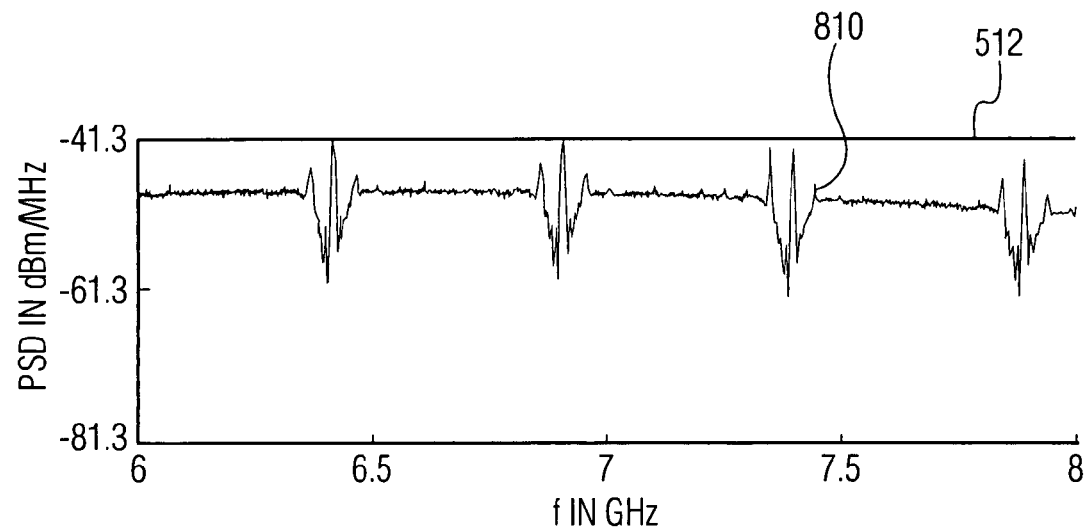

This PSD is continuous, but has significant amplitudes at frequencies separated by $1/T_{TH}$. These amplitudes are linear with the number of repetitions as described above. FIGS. 8A and 8B illustrates this PSD. The same PSD may be achieved by a combined PAM and PPM modulation.

The randomization of the sign of each pulse is now described. In the description presented above it has been shown that time hopping leads to an undesirable concentration of the transmitted power in some narrow frequency bands. Further it has been explained that increasing the length of the time hopping sequence may be insufficient for controlling this effect.

As described above, the considerations are based on repetitions of the same data modulated pulses. These repetitions are introduced, for example, to decrease the effects of catastrophic collisions in a random multiple access scheme.

It is possible, however, to slightly modify a time hopping data transmission in such a way that the time hopping does not influence the PSD of the signal at all. This allows the optimizations of time hopping for the multiple access performance and of the shape of the basic pulse $g_{Pulse(t)}$ to be separated in order to satisfy the FCC emission regulations.

In this modified scheme, a symbol still consists of several pulses, but these pulses differ pseudo randomly in their polarity or sign. This random sign change can be achieved by using a very long pseudo random (PN) sequence having values (1, −1).

The transmitted signal S(t) may be described by equation (12).

$$S(t) = \sum_{l=-\infty}^{\infty}\frac{1}{R}\sum_{i=0}^{R-1}A_{lR+i}\cdot g_{Pulse}(t-l\cdot T_S - B_l\cdot T_{PPM} - \quad (12)$$
$$i\cdot T_F - c_{(lR+i)_F}\cdot T_{TH})$$

Here, $A_i$ is a sample of a random process and $c_i$ is an element of a predetermined sequence.

As the auto correlation function of the modulation reduces to a delta pulse, the PSD is determined only by the shape of the transmitted pulses, as described by equation (13).

$$S_{PPM}(f) = |G_{Pulse}(f)|^2\frac{1}{T_S} \quad (13)$$

Figure 9A:
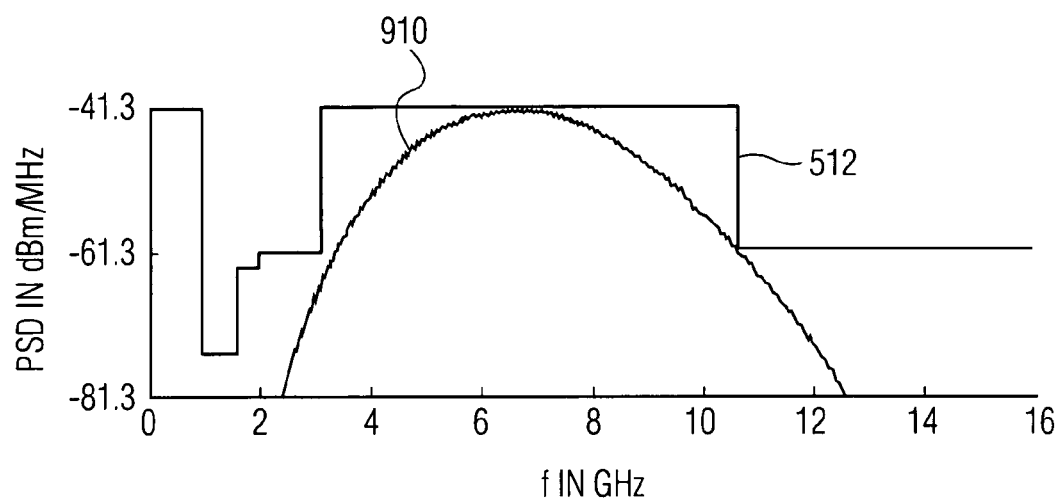
FIGS. 9A and 9B are graphs of amplitude versus frequency that are useful for describing the power spectral densities of the modulation technique according to the present invention.
Figure 9B:
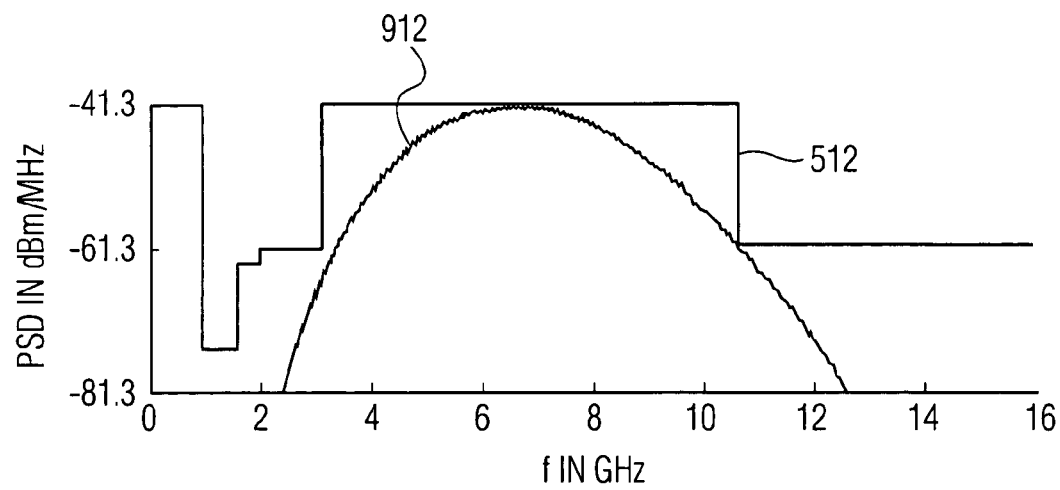

FIGS. 9A and 9B show the PSDs 910 and 912 achieved by a simulation employing this approach with a PPM modulation. Plot 910 in FIG. 9A represents the case with a finite time hopping sequence and plot 912 in FIG. 9B represents the case with an infinite time hopping sequence.

When the data modulation results only in time shifts $T_{PPM}$ and the modulation index is large enough for orthogonal PPM symbols, the receiver does not need to know the sign of a received pulse in order to recover the transmitted data. This enables the transmitter to change the polarity or sign of each transmitted pulse using a truly random process or a pseudo random process.

Figure 10:
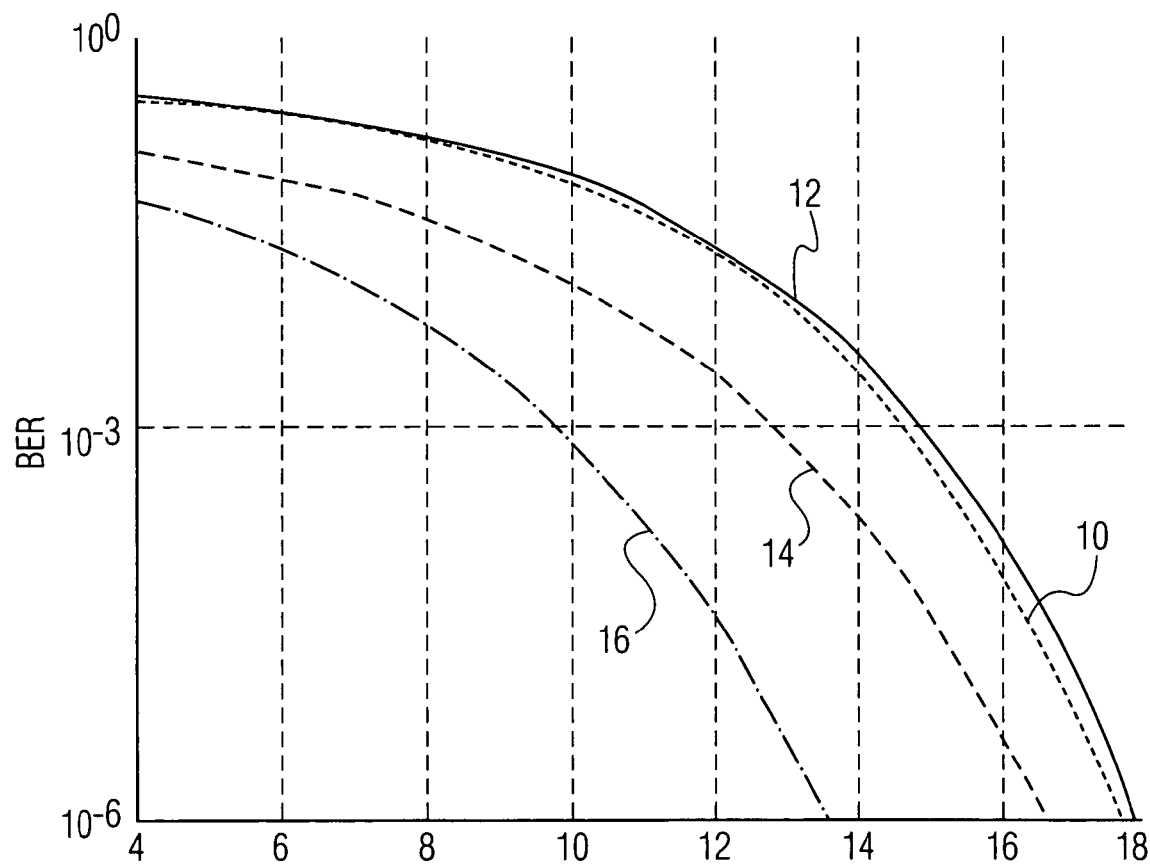
FIG. 10 is a graph of bit error rate (BER) versus signal to noise ratio (SNR) that is useful in describing advantages of the present invention.

FIG. 10 depicts the performance of both non-coherent PPM detectors, referred to as ML (plot 10) and $x^2$ (plot 12), respectively, compared with the performance of a coherent detector for PPM (plot 14) and PAM (plot 16). The SNR required to achieve a certain BER increases with an increasing number of repetitions for incoherent receivers. With an increasing number of repetitions, however, the concentration of power in narrow bands becomes worse. By evaluating the total transmission power of the simulated signals and compensating for the necessary additional SNR of the incoherent receivers it is possible to compare the classical approaches with the approach of the subject invention. Table 2 provides the total transmission power, which can be achieved using the signals considered above without violating FCC regulations.

TABLE 2

| Scheme | | total power in dBm |
|---|---|---|
| PAM | Finite | −13.08 |
| | Infinite | −13.16 |
| PPM | Finite | −21.01 |
| | Infinite | −20.99 |
| PPM subject invention | Finite | −6.81 |
| | Infinite | −6.73 |

In table 2, finite and infinite designations refer to the length of the employed time hopping sequence. As seen in Table 2, there is little difference in total power realized using a finite time hopping scheme, e.g., with a sequence of length 5, and an infinite time hopping scheme, in which the length of the time hopping sequence approaches or exceeds the length of the simulated signal.

If bit error probabilities of less than $10^{-5}$ are considered, the incoherent detection method exhibits approximately a 1.5 dB or 4.5 dB higher SNR than the coherent PPM or PAM demodulation, respectively, as shown in FIG. 10. Table 2 indicates, however, that a common time hopping PPM signal with a finite number of repetitions, e.g., five repetitions (R=5), is attenuated by at least 14 dB compared to a signal modulated according to the method of the present invention. A PAM signal is attenuated by at least 6 dB relative to a signal according to the present invention.

The latter is indicated by the multiplier R in equation (11). Considering the FCC emission limitations, it may be advisable to use even the incoherent detection and a random sign, because this allows more transmission power than is lost in SNR due to the incoherent detection.

A maximum likelihood detector for such a scheme would apply a decision rule given by the inequality equations (14) to the received signal:

$$\sum_{l=0}^{R-1} \log\left(\cosh\left(Y_{(l,0)}\frac{S}{\sigma^2}\right)\right) > \sum_{l=0}^{R-1} \log\left(\cosh\left(Y_{(l,1)}\frac{S}{\sigma^2}\right)\right) \Rightarrow Ho \quad (14)$$

otherwise $H1$ where Y is a single pulse before summation, S is the expected amplitude of the single pulse if received, $\sigma^2$ is the variance of white noise for each sample, and R is a number of time hopped positions. Ho indicates that the received pulse has a first index value (e.g., 0, which corresponds to a logic 0 in the source data) and H1 indicates that the received pulse has a second index value (e.g., 1, which corresponds to a logic 1 in the source data).

For any other non coherent detection, a higher SNR is desirable to achieve a lower BER. A simpler, but suboptimal, decision rule is given by inequality (15), which represents the comparison of the received energy after matched filters sampling at different times.

$$\sum_{l=0}^{R-1} (Y_{(l,0)})^2 > \sum_{l=0}^{R-1} (Y_{(l,1)})^2 \Rightarrow Ho \quad (15)$$

Simulations, as presented in FIG. 10, of a signal with added white Gaussian Noise (AWGN) have shown that the loss due to the suboptimal decision rule is negligible.

The PSD of a time hopping multiple access scheme using repetitions of narrow pulses has been considered. It has been illustrated that pure time hopping results in violations of emission regulations or leads to a relatively large attenuation of the transmitted power. A random change in the sign of the transmitted pulses in a PPM modulation is introduced to solve this problem successfully.

Although the invention has been described in terms of a transmitter 100 and receivers 200/250, it is contemplated that the invention may be implemented in software on a computer (not shown). In this embodiment, one or more of the functions of the various components may be implemented in software that controls the computer. This software may be embodied in a computer readable carrier, for example, a magnetic or optical disk, a memory-card or an audio frequency, radio-frequency, or optical carrier wave.

In addition, although the present invention has been described in terms of reducing discrete PSD components to conform with FCC emission limits, it is contemplated that the present invention is applicable to other wideband technologies, other emission standards, and other applications. For example, the present invention may be employed in military applications to avoid signal detection since some signal detection techniques examine the PSD to identify secure communications.

Further, although the invention is illustrated and described herein with reference to specific embodiments, the invention is not intended to be limited to the details shown. Various modifications may be made in the details within the scope and range of equivalents of the claims and without departing from the invention.

What is claimed:

1. A method for generating wideband signals for transmitting source data, the wideband signals including wideband signal pulses and having reduced discrete power spectral density (PSD) components, the method comprising the steps of:
   pulse modulating the source data;
   repeating and time hopping pulses within the pulse modulated source data;
   selectively inverting the polarity of the repeated and time hopped pulses; and
   modulating the wideband signal pulses with the selectively inverted pulses.

2. The method of claim 1, wherein the pulse modulating step comprises the step of modulating the source data using at least one of (1) a pulse position modulation scheme and (2) a pulse amplitude modulation scheme.

3. The method of claim 1, wherein the selectively inverting step comprises the step of:

selectively inverting the polarity of the repeated and time hopped pulses responsive to a pseudo random number sequence.

4. An apparatus for generating wideband signals for transmitting source data, the wideband signals including wideband signal pulses and having reduced discrete power spectral density (PSD) components, the apparatus comprising:
a modulator that pulse modulates the source data;
a repeater coupled to the modulator, the repeater configured to repeat and time hop pulses within the pulse modulated source data;
an inverter coupled to the repeater, the inverter configured to selectively invert the polarity of the repeated and time hopped pulses; and
a pulse shaping circuit coupled to the inverter, the pulse shaping circuit configured to modulate the wideband pulses with the selectively inverted pulses for transmission.

5. The apparatus of claim 4, wherein the modulator is configured to modulate the source data using at least one of (1) a pulse position modulation scheme and (2) a pulse amplitude modulation scheme.

6. The apparatus of claim 4, wherein the pulse shaping circuit is an ultra wideband (UWB) pulse shaping circuit.

7. A method for processing a wideband signal carrying a data signal having randomly inverted pulses, the randomly inverted pulses generated from source data that is pulse modulated, repeated, and time hopped, the method comprising the steps of:
receiving the data signal carried by the wideband signal;
sampling the received data signal at time hopped positions;
selectively inverting the pulses within the received data signal;
summing corresponding repeated pulses within the received data signal after sampling and inverting; and
deriving the source data from the summed pulses.

8. The method of claim 7, wherein the source data is pulse position modulated (PPM) using at least two pulse positions in a symbol and each pulse is repeated and time hopped at least once to create corresponding pulses, each corresponding pulse having a corresponding relative pulse position in the symbol, and wherein the method further comprises the step of:
creating an intermediate pulse stream for each pulse position sampled at the time hopped positions;
wherein the summing step comprises the step of summing the pulses within each intermediate pulse stream for corresponding pulses; and
wherein the deriving step comprises the step of demodulating the wideband signal responsive the maximum summed value for corresponding pulses within each intermediate pulse stream.

9. The method of claim 7, wherein the deriving step comprises the step of:
demodulating the summed pulses using a phase amplitude modulation (PAM) scheme.

10. An apparatus for processing a wideband signal having randomly inverted pulses, the randomly inverted pulses generated from source data that is pulse modulated, repeated, and time hopped, the apparatus comprising:
a filter configured to receive and discriminate the wideband signal having randomly inverted pulses;
an inverted coupled to the filter, the inverter configured to selectively invert the randomly inverted pulses to remove the random inversion;
a summing circuit coupled to the inverter, the summing circuit configured to sum corresponding repeated pulses; and
a demodulator coupled to the summing circuit, the demodulator configured to demodulate the summed corresponding repeated pulses to derive the source data.

11. The apparatus of claim 10, wherein the filter is a matched filter for detecting an ultra wideband (UWB) pulse.

12. The apparatus of claim 10, wherein the demodulator is a pulse demodulator that is configured to demodulate the data using at least one of (1) a pulse position demodulation scheme and (2) a pulse amplitude demodulation scheme.

13. A receiving method for use with a wideband signal having randomly inverted pulses, the method comprising the steps of:
receiving the wideband signal; and
applying a function to map pulses of either polarity within the wideband signal to a single polarity to produce a pulse stream in which all pulses have the same polarity, the function comprising squaring the pulses of either polarity within the wideband signal to produce the pulse stream.

14. The method of claim 13, wherein the step of applying a function comprises the step of:
producing a corresponding pulse for each pulse, each pulse and corresponding pulse having the same polarity; and
multiplying each pulse by its corresponding pulse.

15. The method of claim 13, wherein the step of applying a function comprises the step of:
removing sign information from the pulses of either polarity.

16. The method of claim 13, wherein the wideband signal includes source data that is pulse position modulated (PPM) using at least two pulse positions in a symbol and each pulse is repeated and time hopped at least once to create corresponding pulses, each corresponding pulse having a corresponding relative pulse position in the symbol and wherein the step of applying a function comprises the step of:
applying the following function:

$$\sum_{l=0}^{R-1} \log\left(\cosh\left(Y_{(l,0)} \frac{S}{\sigma^2}\right)\right) > \sum_{l=0}^{R-1} \log\left(\cosh\left(Y_{(l,1)} \frac{S}{\sigma^2}\right)\right) \Rightarrow Ho\ ;$$

otherwise $H1$;

where Y is a single pulse before summation, S is the expected amplitude of the single pulse if received, $\sigma^2$ is the variance of white noise for each sample, R is a number of time hopped positions, Ho indicates that the received pulse has a first index value, and H1 indicates that the received pulse has a second index value.

17. The method of claim 13, wherein the wideband signal is pulse position modulated (PPM) and wherein the method further comprises the step of:
demodulating the wideband signal using a PPM demodulation scheme.

18. The method of claim 13, wherein the wideband signal includes source data that is pulse position modulated (PPM) using at least two pulse positions in a symbol and each pulse is repeated and time hopped at least once to create corresponding pulses, each corresponding pulse having a corresponding relative pulse position in the symbol, and wherein the method further comprises the steps of:

creating an intermediate pulse stream for each pulse position sampled at the time hopped positions;

summing the pulses within each intermediate pulse stream after applying the function; and demodulating the wideband signal responsive the maximum summed pulses within each intermediate pulse stream.

19. A receiving apparatus for processing a wideband signal having randomly inverted pulses having either a first polarity or a second polarity opposite the first polarity, the apparatus comprising: a filter configured to receive and discriminate the wideband signal having randomly inverted pulses; and a function circuit coupled to the filter, the function circuit configured to map pulses of either polarity within the wideband signal to a single polarity to produce a pulse stream in which all pulses have the same polarity, the function circuit is configured to square the pulses of either polarity within the wideband signal to produce the pulse stream.

20. The apparatus of claim 19, wherein the filter is a matched filter for detecting ultra wideband (UWB) pulses.

21. The apparatus of claim 19, wherein the function circuit is configured to produce a corresponding pulse for each pulse, each pulse and corresponding pulse having the same polarity, and multiply each pulse by its corresponding pulse.

22. The method of claim 19, wherein the function circuit is configured to remove sign information from the pulses of either polarity.

23. The method of claim 19, wherein the wideband signal includes source data that is pulse position modulated (PPM) using at least two pulse positions in a symbol and each pulse is repeated and time hopped at least once to create corresponding pulses, each corresponding pulse having a corresponding relative pulse position in the symbol and wherein the function circuit is configured to apply the following function:

$$\sum_{l=0}^{R-1} \log\left(\cosh\left(Y_{(l,0)} \frac{S}{\sigma^2}\right)\right) > \sum_{l=0}^{R-1} \log\left(\cosh\left(Y_{(l,1)} \frac{S}{\sigma^2}\right)\right) \Rightarrow Ho$$

otherwise $H1$;

where Y is a single pulse before summation, S is the expected amplitude of the single pulse if received, $\sigma^2$ is the variance of white noise for each sample, R is a number of time hopped positions, Ho indicates that the received pulse has a first index value, and H1 indicates that the received pulse has a second index value.

24. The apparatus of claim 19, wherein the wideband signal is pulse position modulated (PPM) and wherein the apparatus further comprises:

a demodulator that demodulates the wideband signal using a PPM demodulation scheme.

25. The apparatus of claim 19, wherein the wideband signal includes source data that is pulse position modulated (PPM) using at least two pulse positions in a symbol and each pulse is repeated and time hopped at least once to create corresponding pulses, each of the corresponding pulses having a corresponding relative pulse position in the symbol, and wherein the apparatus further comprises:

a delay circuit coupled to the function circuit, the delay circuit configured to create an intermediate pulse stream for each pulse position that is sampled at time hopped positions;

a summing circuit coupled to the function circuit that sums the corresponding pulses within each intermediate pulse stream after the function circuit maps the pulses to a single polarity; and a comparator coupled to the summing circuit that demodulates the pulse position modulated wideband signal responsive a maximum summed pulse value within each summed intermediate pulse stream.

* * * * *

UNITED STATES PATENT AND TRADEMARK OFFICE
CERTIFICATE OF CORRECTION

| | |
|---|---|
| PATENT NO. | : 7,317,748 B2 |
| APPLICATION NO. | : 10/786947 |
| DATED | : January 8, 2008 |
| INVENTOR(S) | : Nikolaus H. Lehmann |

It is certified that error appears in the above-identified patent and that said Letters Patent is hereby corrected as shown below:

On the Cover Page under Item (75) Inventors
"Alexander M. Halm ovich" should read --Alexander M. Haimovich--

Signed and Sealed this

Twenty-sixth Day of August, 2008

JON W. DUDAS
*Director of the United States Patent and Trademark Office*